3,287,350
PROCESS FOR OBTAINING TAMARIND SEED JELLOSE

Yoji Deguchi, Nishinomiya-shi, and Toshie Shiba, Neyagawa-shi, Japan, assignors to Dainippon Pharmaceutical Co., Ltd., Osaka, Japan, a corporation of Japan
No Drawing. Filed Aug. 3, 1964, Ser. No. 387,205
Claims priority, application Japan, Aug. 17, 1963, 38/44,194
2 Claims. (Cl. 260—209)

This invention relates to a process for obtaining commercially, at low cost, high grade powdered tamarind seed jellose from the seeds of the leguminous evergreen tree *Tamarindus indica* Linn., which are found in the tropics.

The tamarind seed jellose is the principal constituent of the foregoing seeds of *Tamarindus indica* Linn. and is a vegetable polysaccharide composed of glucose, xylose and galactose. While it is useful as a gelling agent similarly as with fruit pectin, it is also valuable as a thickening agent and stabilizer.

As the process for recovering the polysaccharide from the extract obtained by treating tamarind seeds with hot water, heretofore known was the process in which the extract was concentrated under reduced pressure and then dried in a drum drier. According to this process however, the viscosity of the extract rises as the concentration proceeds. In consequence, the effectiveness of the concentration under reduced pressure was very limited, and in addition, because a drier is used, not only is there a tendency of the product to become discolored to a yellow or yellowish brown color but it is also impossible to obtain a product excelling in viscosity properties. Alternatively, there has been proposed a process in which, instead of drum-drying, the extract concentrated under reduced pressure is poured into twice its volume of ethanol to precipitate the desired jellose as a fibrous mass. This process however has the disadvantage that an ethanol-recovery plant is necessary. Accordingly, in view of the entailment of considerable expenses in the concentration under reduced pressure and/or recovery of ethanol according to these prior art processes, these processes were not commercially profitable.

It is therefore a primary object of the present invention to provide a commercially feasible process for recovering tamarind seed jellose from an aqueous extract obtained by treating the seeds of *Tamarindus indica* Linn.

The process of the invention by which the foregoing object is achieved comprises adding to the aqueous extract obtained by treating the seeds of *Tamarindus indica* Linn. with hot water at least one sulfate selected from the group consisting of sodium sulfate, ammonium sulfate, magnesium sulfate and aluminum sulfate thereby coagulating the jellose, separating the resulting coagulate from the extract and recovering the jellose therefrom.

The starting extract can be prepared in the following manner, for example. The seeds of *Tamarindus indica* Linn. are first ground into about 3 to 16-mesh particles and then bleached. As the bleaching agent, preferably used is one which is reducing, such as a sulfurous acid solution or sodium hydrosulfite. Next, the divided seeds are added to about 18 to 30-fold amount, and preferably about 25-fold amount, of water, into which is then blown steam for about 1.5 to 4 hours, preferably about 2 to 3 hours, following which the mixture is hot-filtered. If the water used is less than about an 18-fold amount, the viscosity of the aqueous extract exceeds about 8000 cps. (at 25° C.) and its processing becomes difficult. On the other hand, the use of water in an amount in excess of what is necessary is economically disadvantageous. By using about a 25-fold amount of water an aqueous extract can be obtained whose viscosity is less than 1000 cps. (at 25° C.) and in which the concentration of tamarind seed jellose is about 1.5% by weight. Further, the blowing in the steam for a longer time (e.g. 5 hours) is also undesirable. The reason is that there is a tendency of the particles to disintegrate further during the time the steam is blown in. This results in the dispersion into the water of the fibrous matter also.

While that described above consisting of treating the seeds of *Tamarindus indica* Linn. with hot water is a preferred mode of obtaining the starting aqueous extract for the process of this invention, the mode of obtaining the starting aqueous extract is not essentially the subject matter of this invention.

According to the invention, the desired jellose is coagulated from an extract as hereinbefore described by adding to the extract at least one sulfate selected from the group consisting of sodium sulfate, ammonium sulfate, magnesium sulfate and aluminum sulfate. By the addition of the selected sulfates, the coagulate rises to the surface of the extract as fluffy flakes.

Potassium sulfate, ferrous sulfate, cupric sulfate, calcium sulfate, sodium chloride, ammonium chloride, calcium chloride, sodium phosphate and sodium dihydrophosphate are completely ineffective in coagulating the desired jellose from the aqueous extract. In spite of the foregoing fact, the four sulfates selected coagulate the jellose as fluffy flakes from the aqueous extract. This indeed is surprising and entirely unexpected. Although the selected sulfates can be added to the extract in the form of a concentrated aqueous solution, they are best added as solids. The coagulation of the jellose takes place when the sulfate concentration in the extract reaches a given value. The jellose coagulates from an aqueous 1.5% by weight jellose solution at 70° C. when the sulfate concentration in the extract exceeds the critical concentrations shown in Table 1.

TABLE 1.—Critical Concentration of Sulfate

| Sulfate: | Conc., percent by wt. |
|---|---|
| $Na_2SO_4$ | 25 |
| $(NH_4)_2SO_4$ | 46 |
| $MgSO_4$ | 23 |
| $Al_2(SO_4)_3$ | 24–26 |

In most instances, it is best to add the sulfates in a concentration somewhat in excess of the critical concentrations indicated in Table 1.

The jellose coagulated as fluffy flakes in this manner is then separated by sieving.

When the so separated coagulate is dried, the desired jellose can be recovered. The coagulate, before being dried, is preferably washed thoroughly to remove the sulfates that are occluded. The separated coagulate can be removed of its excess liquid by pressing or other mechanical means and thereafter washed with a suitable solvent. In washing the coagulate, any solvent which dissolves the sulfates but does not dissolve the desired jellose can be used. The aqueous lower aliphatic alcohols, particularly aqueous ethanol, are desirable desalting solvents. If the alcohol concentration exceeds 40% by weight, the dissolving of the sulfates is difficult, whereas if the alcohol concentration is less than 20% by weight, a part of the desired jellose is dissolved and lost. Hence, preferably used is an aqueous alcohol of concentration 20–40% by weight, and more preferably about 25–25% by weight. The washed jellose can then be dried and ground.

The so obtained tamarind seed jellose is either white or grayish white in color, without taste nor odor and not toxic in the least, while its jelly strength (jellose proper 1%, cane sugar 50%) is above 250 g./cm.$^2$.

For a still clearer understanding of the invention the following examples are given.

Example 1

To 4.3 g. of coarsely ground seeds of *Tamarindus indica* Linn. is added 20 l. of 0.25% sulfurous acid solution, and after steeping for 24 hours, the sulfurous acid solution is filtered off. The coarsely ground seed is then transferred to an extraction vessel and after adding 100 l. of water, is extracted by heating for about 2 hours at 95–100° C. After the extract is filtered under pressure, 50 kg. of ammonium sulfate is introduced with stirring to about 100 kg. of the filtrate at 70° C. to coagulate the tamarind seed jellose. By separating this by sieving and pressing the mother liquor, 6 kg. of a wet coagulate are obtained. Ten l. of 30% ethanol is then added to this coagulate and stirred, following which the mixture is centrifuged to separate the jellose which is dried and ground to yield 1.7 kg. of the finished product.

Example 2

To about 100 kg. of the extracted filtrate obtained as in Example 1, 50 kg. of aluminum sulfate $$(Al_2(SO_4)_3 \cdot 18H_2O)$$

are introduced with stirring to coagulate the tamarind seed jellose. This coagulate is separated from the mother liquor and pressed, after which 20 l. of 30% ethanol are added and stirred. After centrifuging the mixture, the separated jellose is dried and ground to yield 1.6 kg. of the finished product.

Example 3

To about 100 kg. of the extracted filtrate obtained as in Example 1, 25 kg. of sodium sulfate are introduced with stirring at 70° C. to coagulate the tamarind seed jellose. After separating this coagulate from the mother liquor and pressing, 28 l. of 30% ethanol are added and stirred. Then, after filtering off the ethanol, the jellose is again pressed, dried and ground to yield 1.7 kg. of the finished product.

Example 4

To about 100 kg. of the extracted filtrate obtained as in Example 1 60 kg. of magnesium sulfate ($MgSO_4 \cdot 7H_2O$) are introduced with stirring at 70° C. to coagulate the tamarind seed jellose. This coagulate is then separated from the mother liquor and pressed, after which 20 l. of 30% ethanol are added and the mixture is stirred and centrifuged. The separated jellose is then dried and ground to yield 1.7 kg. of the finished product.

We claim:

1. Process for tamarind seed jellose from an aqueous extract obtained by treating seeds of *Tamarindus indica* Linn. with hot water which comprises adding to said extract at least one sulfate selected from the group consisting of sodium sulfate, ammonium sulfate, magnesium sulfate and aluminum sulfate thereby coagulating the jellose, separating the resulting coagulate from the extract and recovering the jellose therefrom.

2. Process for obtaining tamarind seed jellose from an aqueous extract obtained by treating seeds of *Tamarindus indica* Linn. with hot water, which comprises adding to said extract at least one sulfate selected from the group consisting of sodium sulfate, ammonium sulfate, magnesium sulfate and aluminum sulfate thereby coagulating the jellose, separating the resulting coagulate from the extract, washing the coagulate with a 20–40% by weight aqueous lower aliphatic alcohol and thereafter drying the same.

No references cited.

LEWIS GOTTS, *Primary Examiner.*

J. R. BROWN, *Assistant Examiner.*